US011151607B2

(12) United States Patent
Ericson

(10) Patent No.: US 11,151,607 B2
(45) Date of Patent: Oct. 19, 2021

(54) BLOCKCHAIN-ENABLED TARGETED CONTENT SYSTEM

(71) Applicant: PAYPAL, INC., San Jose, CA (US)

(72) Inventor: Braden Christopher Ericson, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 377 days.

(21) Appl. No.: 15/858,327

(22) Filed: Dec. 29, 2017

(65) Prior Publication Data
US 2019/0205932 A1 Jul. 4, 2019

(51) Int. Cl.
*G06Q 30/02* (2012.01)
*G06Q 20/06* (2012.01)

(52) U.S. Cl.
CPC ..... *G06Q 30/0255* (2013.01); *G06Q 20/0658* (2013.01)

(58) Field of Classification Search
CPC .............. G06Q 30/0255; G06Q 20/0658
USPC ............... 705/14.53, 26.41, 26.62; 725/62
See application file for complete search history.

(56) References Cited

U.S. PATENT DOCUMENTS

2011/0070820 A1* 3/2011 Gao ............... H04W 4/06 455/3.06
2017/0126811 A1* 5/2017 Picciotto .......... H04L 67/141
2017/0352031 A1* 12/2017 Collin ................ G06Q 30/06
2018/0025442 A1* 1/2018 Isaacson ........ G06Q 30/0633 705/26.62
2018/0211313 A1* 7/2018 Narahari ........... G06Q 40/025

FOREIGN PATENT DOCUMENTS

CN  102163213 A * 8/2011

OTHER PUBLICATIONS

Roman Beck, Blockchain Technology in Business and Information Systems Research, 2017 (Year: 2017).*
J Sun, Blockchain-based sharing services: What blockchain technology can contribute to smart cities, 2016 (Year: 2016).*

* cited by examiner

*Primary Examiner* — Tarek Elchanti
(74) *Attorney, Agent, or Firm* — Haynes and Boone, LLP

(57) ABSTRACT

Targeted content is provided for display on a user device by detecting a first user interaction between the user device and a currently viewed webpage. A first transaction that includes a first user device identifier for the user device is generated. The first transaction is broadcasted to cause the first transaction to be sent to a smart contract stored in a distributed ledger. In response to the execution of the smart contract, first user information associated with a second user interaction between the user device and a previously viewed webpage that occurred prior to the first user interaction is received. Content for display on the user device via the currently viewed webpage is determined based on the first user information and the content is provided for display on the user device within the currently viewed webpage.

20 Claims, 11 Drawing Sheets

BLOCKCHAIN-ENABLED TARGETED CONTENT SYSTEM

BACKGROUND

The present disclosure generally relates to providing content to a user through a webpage, and more particularly to enabling the provisioning of targeted content to a user through a webpage using smart contracts stored on a blockchain.

Blockchains, also referred to herein as distributed ledgers, are used to track transactions involving crypto currencies (also called virtual currencies) such as, for example, Bitcoin, Litecoin, Ethereum, Monera, and/or other crypto currencies known in the art. Crypto currency systems provide decentralized digital money that is issued and maintained by distributed software running a network of computing devices, rather than by central banks or public authorities that conventionally issue and control fiat currencies. For example, Bitcoin is a type of decentralized crypto currency that provides for peer-to-peer transactions without an intermediary, with those peer-to-peer transactions verified by Bitcoin network nodes (i.e., the distributed network of computing devices discussed above) and recorded in a public distributed ledger referred to as a blockchain. Crypto currencies like Bitcoin have revolutionized money transfer and payment technology by allowing for censorship resistant, decentralized peer-to-peer transfer of values between users.

Distributed blockchains may also be used for a number of different other technologies besides virtual currency. For instance, Bitcoin and other currency focused networks provide for the execution of a basic "contract" that transfers value between users. However, networks such as the Ethereum network have been created to store executable code (called "smart contracts") that operates to enforce more complicated relationships with cryptographic software, and extensions to traditionally currency-centric blockchains such as the Bitcoin network have proposed similar enhanced functionality as well. For example, such smart contracts may monitor for conditions defined in the smart contract and, when a condition is determined to be present, the code may execute and provide an output. As such, smart contracts allow two or more parties to perform more relatively complex transactions in a decentralized, self-executing, self-enforceable manner to provide irreversible transactions that can be tracked on a blockchain and without the need for an intermediary.

Figure 1:
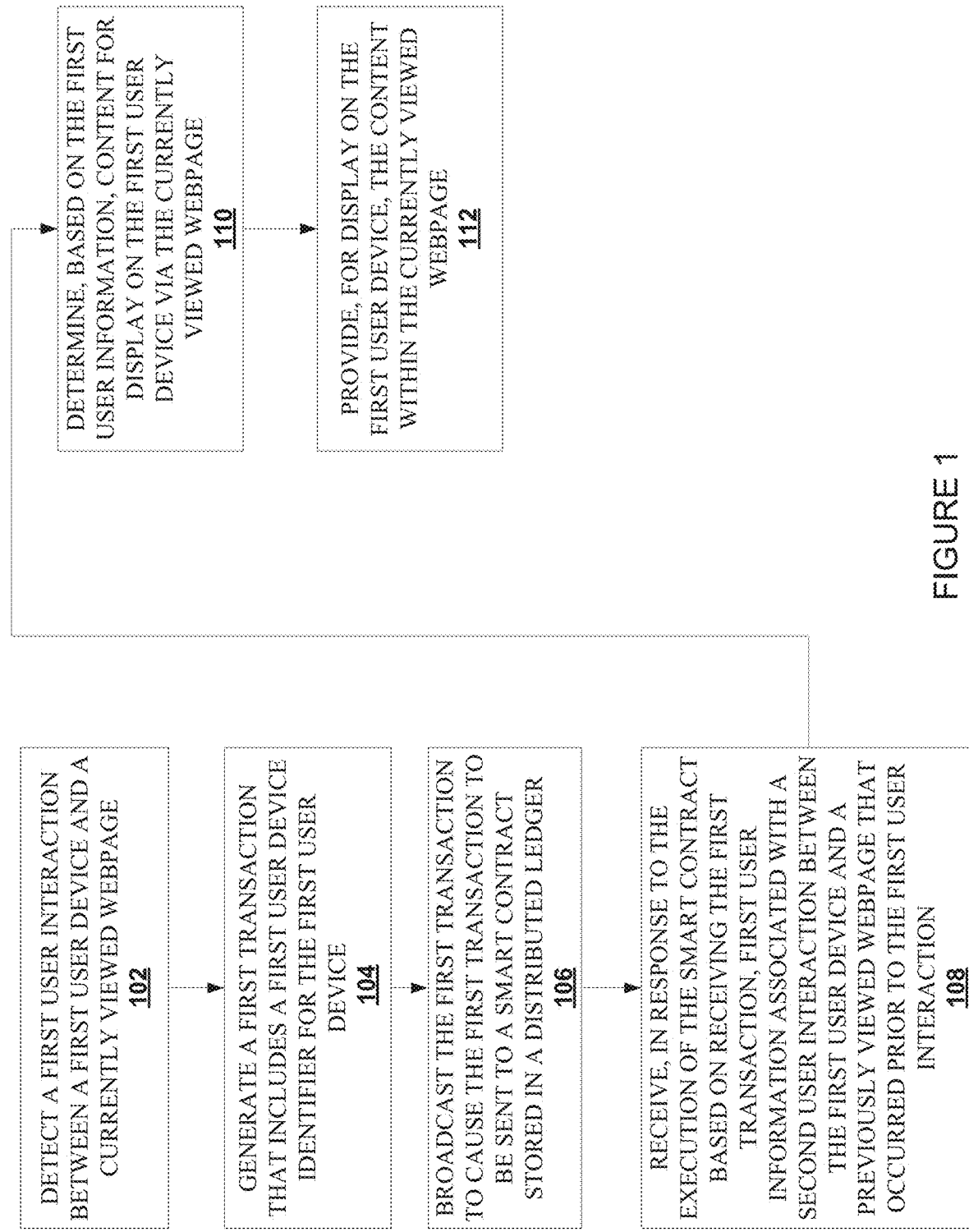
FIG. 1 is a flow chart illustrating an embodiment of a method for providing targeted content using smart contracts.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Embodiments of the present disclosure include systems and methods for providing targeted content using smart contracts stored in a blockchain (which may also be referred to herein as a distributed ledger). In some embodiments, website and/or webpage technology may be enhanced to provide targeted content such as advertisements to users viewing those websites or webpages in order to ensure that the content enhanced website or webpage is displayed to the most receptive audiences based on traits and/or behavioral variables of that audience such as, for example, browsing histories, purchase histories, recent activity on the Internet, and/or a variety of other traits that would be apparent to one of skill in the art in possession of the present disclosure. The goal of such targeted-content-enhanced websites/webpages is to provide users viewing the website/webpage with information they will be more likely to select and/or request further information about. Similarly, content providers may track and use their users' histories of previously viewed video, image, and/or audio content to provide recommendations of additional content that a user may be interested in viewing. Enhancing websites/webpages with content, providing recommendations of additional content for viewing, and/or utilizing any of a variety of user information histories to target content provided to a user operates to enhance user experience with a website/webpage, enhance sales of merchants providing products and/or services, drive users to desired websites/webpages, and/or provide other benefits known in the art.

One conventional method of tracking a user's behavior on the Internet is performed using cookies that are stored in association with a user's web browser. For example, cookies may be used in association with a web browser to record the user's browsing activity, information that the user has entered into form fields displayed in the web browser, and/or a variety other Internet activity of the user. This information can be provided to a content provider that may use the information to generate targeted content for display on a website/webpage. While the use of cookies has been beneficial to Internet advertisers and other content providers, this form of gathering information on users and its use to provide targeted content has initiated privacy concerns. For example, users are often unaware that their actions on the Internet are being tracked, and users are not provided any compensation for their information that may be used and/or sold to other parties. Furthermore, cookies and other tracking software on a user device can be targeted by unscrupulous parties to obtain the sensitive user information that is collected for illegitimate uses. As a result, some web browsers have been created that attempt to eliminate, disable, or otherwise prevent cookies and other tracking systems from user device interactions with a website server, making it more difficult to provide targeted content to users.

As discussed below, the systems and methods of the present disclosure provide an alternative system for tracking user histories and providing targeted content, while removing the use of tracking software from user devices to alleviate at least some of the security concerns associated with the cookies discussed above. In various embodiments of the present disclosure, providers and/or users of the systems of the present disclosure may generate a smart contract for provision on a distributed ledger and for use in compiling and sharing user information between users of the systems. For example, each website and/or content provider may track user interactions with their website and/or content, and store that tracked user information along with a user device identifier in a database associated with the service provider. The website and/or content provider may then generate a transaction for each tracking session that includes a user device identifier associated with a link to the information gathered and stored in its database. The service provider may send the transaction to the smart contract provided on the distributed ledger, which then operates to store that transaction (and its associated data) on the distributed ledger.

Subsequently, a website/page provider, content provider, or other user of the system that wants to provide targeted content (e.g., an advertisement) to a user device that interacts with a website or webpage may broadcast a subsequent "request" transaction that associates the user device identifier for the user device with the smart contract in the distributed ledger. In response to receiving the request transaction with the user device identifier, the smart contract executes and, in response, operates to retrieve any or all of the user information that has been previously associated (e.g., in previous "provisioning" transactions) with that user device identifier via the smart contract. For example, the link(s) that are stored in the provisioning transactions (which were recorded on the blockchain after having been previously sent to the smart contract) and that point to the location(s) of the user information stored on various databases (e.g., by website and/or content providers) may be retrieved via execution of the smart contract and provided to the provider device that sent the request transaction. The service provider device may then use those link(s) to retrieve the user information from those databases, and use that information to identify, generate, determine, and/or other provide new content for display on the user device. As would be appreciated by one of skill in the art in possession of the present disclosure, the use of smart contracts in the distributed ledger as discussed above reduces the necessity of tracking user interactions at the user device (e.g., via cookies). Furthermore, the smart contract of the present disclosure may be configured to provide the user more power in determining how their information is disseminated, and even to provide crypto currency payments for such information dissemination. For example, the smart contract may be configured to allow the user of the user device to define service providers that may or may not track and distribute their information, which service providers may retrieve their information, and/or to implement a variety of other rules that would be apparent to one of skill in the art in possession of the present disclosure.

Referring now to FIGS. 1, 2, 4 and 5, a method 100 for providing targeted content using smart contracts is illustrated. In some embodiments of the method 100 described below, one or more system provider devices may operate to perform the method 100. For example, a distributed group of devices may operate to generate (a.k.a. "mine") a crypto currency while creating a blockchain (also referred below as distributed ledger), and maintain the blockchain while performing the method 100 as detailed below. The blockchain described herein may be a private or public distributed ledger. In another embodiment, one or more service provider devices may perform the method 100 to provide the targeted content using smart contracts, as well as perform the maintenance of the blockchain and smart contract. For example, a payment service provider such as, for example, PayPal, Inc. of San Jose, Calif., may utilize a payment service provider device to perform at least some of the method 100 (e.g., tracking user interactions and retrieving user information) discussed below, and in some embodiments may operate in cooperation with one or more other service providers (via their service provider devices) and/or payees (via their payee devices) to perform the method 100 discussed below. However, these embodiments are meant to be merely exemplary, and one of skill in the art in possession of the present disclosure will recognize that a wide variety of system providers may operate, alone or together, to provide the systems and methods discussed herein without departing from the scope of the present disclosure.

Figure 2:
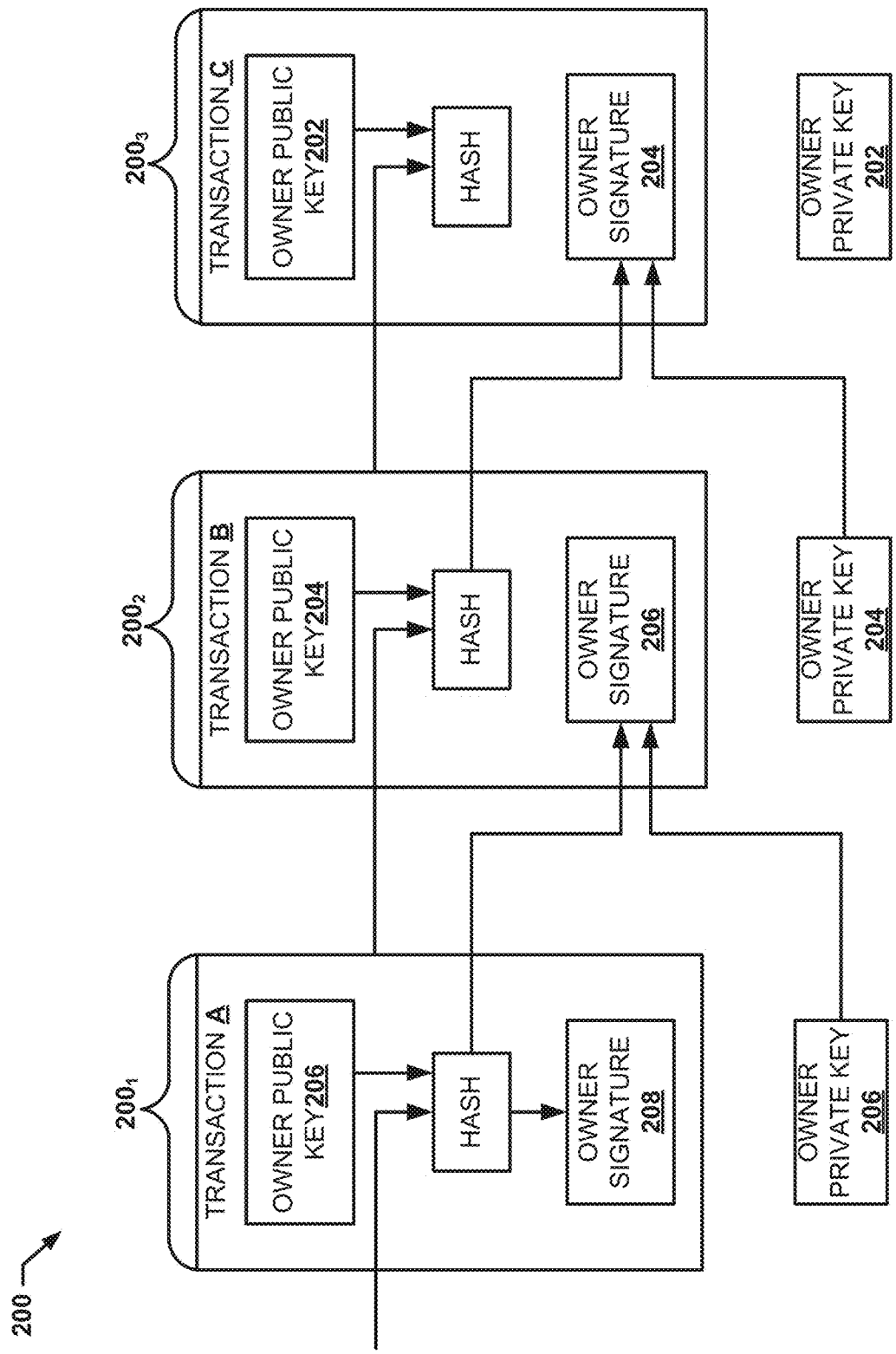
FIG. 2 is a schematic view illustrating an embodiment of an electronic coin.

Referring now to FIG. 2, an embodiment of an electronic coin 200 is illustrated and described briefly for reference in the discussion below. While the examples of the electronic coin 200 and the blockchain 300 of FIG. 3 describe the basics of electronic coins and blockchains utilized to record currency transactions, one of skill in the art in possession of the present disclosure will recognize that electronic coins and blockchains may be used for recording and/or tracking a variety of other information such as credit information, identity information, medical information, education information, other personal user information, shipment information, food traceability, property ownership, and/or any other information that would be apparent to one of skill in the alt in possession of the present disclosure.

In the embodiment illustrated in FIG. 2, a virtual currency system associated with the present disclosure may define an electronic coin as a chain of digital signatures provided by previous owners of the electronic coin to subsequent owners of the electronic coin. In the illustrated embodiment, the electronic coin 200 is owned by an owner 202, and FIG. 2 illustrates how the electronic coin 200 is defined by the digital signatures of previous owners 204, 206, and 208. Specifically, in transaction A, a hash value of the public key of owner 206 the owner receiving, as a result of transaction A, an electronic coin $200_1$ defined by digital signatures provided up to transaction A) and the previous transaction (not illustrated, but occurring prior to transaction A) was signed by owner 208 (i.e., the owner providing, as a result of transaction A, the electronic coin $200_1$ defined by digital signatures provided up to transaction A) using a private key and added to an initial electronic coin (which was defined by digital signatures provided up to the transaction prior to transaction A) such that the electronic coin $200_1$ was transferred to owner 206.

Similarly, in transaction 13, a hash value of the public key of owner 204 (i.e., the owner receiving, as a result of transaction B, an electronic coin $200_2$ defined by digital signatures provided up to transaction B) and transaction A was signed by owner 206 using a private key and added to the electronic coin $200_1$ such that the electronic coin $200_2$ was transferred to owner 204. Similarly, in transaction C, a hash value of the public key of owner 202 (i.e., the owner receiving, as a result of transaction C, the electronic coin 200 defined by digital signatures provided up to transaction C) and the transaction B was signed by owner 204 using a private key and added to the electronic coin $200_2$ such that the electronic coin 200 was transferred to owner 202. As is understood in the art, any payee receiving an electronic coin (e.g., owner 206 in transaction A, owner 204 in transaction B, and owner 202 in transaction C) can verify the signatures to verify the chain of ownership of the electronic coin. In the discussion below, it should be understood that the term "electronic coin(s)" may be used to encompass any amount or type of electronic coins or virtual/electronic currency, from fractions of a coin (e.g., 0.00564500 electronic coins) to many multiples of coins (e.g., 56,000.00000000 electronic coins).

Figure 3:
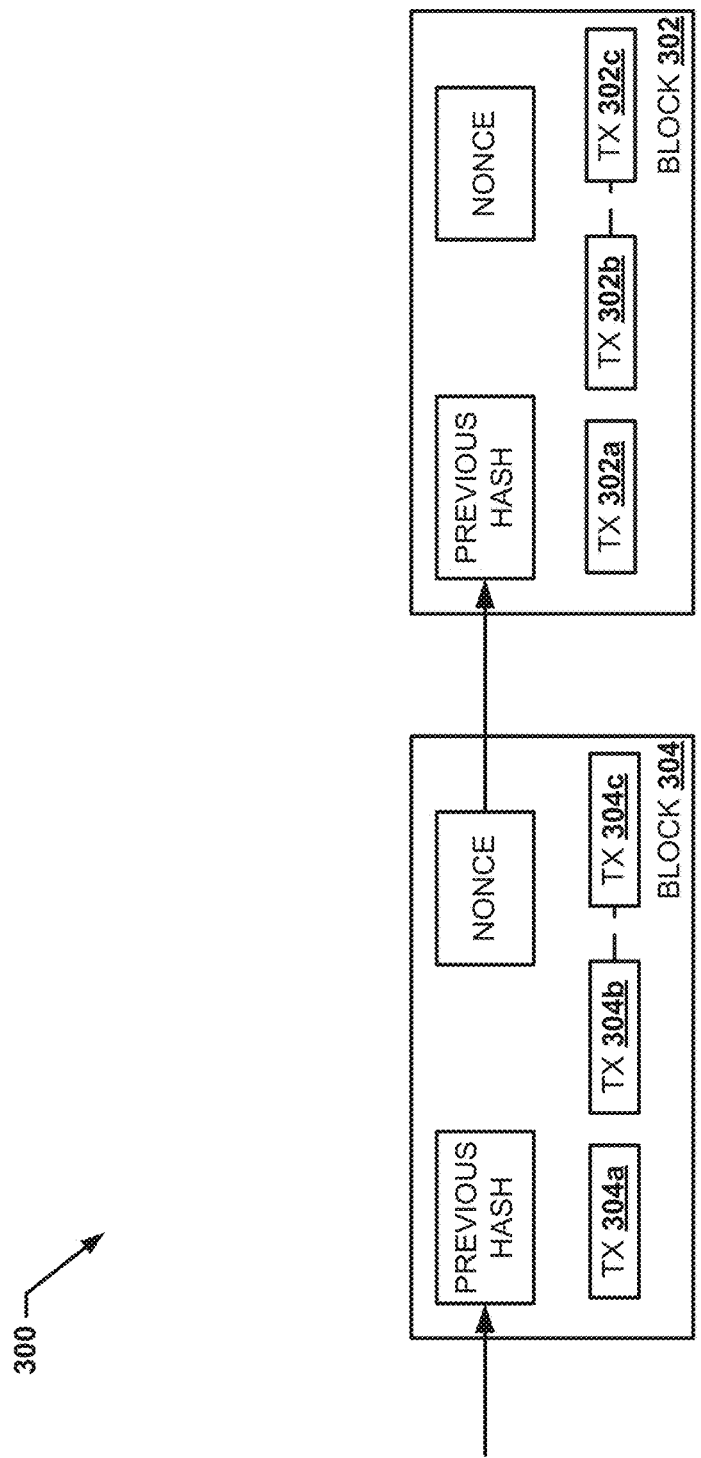
FIG. 3 is a schematic view illustrating an embodiment of a distributed ledger.

Referring now to FIG. 3, an embodiment of a distributed ledger 300 is illustrated and described briefly for reference in the discussion below. As discussed above, the distributed ledger 300 may operate to verify that payers transferring an electronic coin (e.g., referring back to FIG. 2, owner 206 in transaction A, owner 204 in transaction B, and owner 202 in transaction C) did not "double-spend" (e.g., use a private key to sign any previous transactions involving) that electronic coin. To produce the distributed ledger 300, a distributed network of devices operate to agree on a single history of transactions in the order in which they were received such that it may be determined that a transaction between a payer and a payee using an electronic coin is the first transaction associated with that electronic coin. Each device in the distributed network operates to collect new transactions into a block, and then to increment a proof-of work system that includes determining a value that when hashed with the block provides a required number of zero bits.

For example, for a block 302 that includes a plurality of transactions 302a, 302b, and up to 302c, a device in the distributed network may increment a nonce in the block 302 until a value is found that gives a hash value of the block 302 the required number of zero bits. The device may then "chain" the block 302 to the previous block 304 (which may have been "chained" to a previous block, not illustrated, in the same manner). When devices in the distributed network find the proof-of-work for a block, that block (e.g., block 302) is broadcast to the distributed network, and other devices in the distributed network will accept that block if all the transactions in it are valid and not already spent (which may be determined by creating the next block using the hash value of the accepted block 302). The distributed network will always consider the longest chain of blocks to be the correct one, and will operate to continue to extend it. If a device receives two different versions of a block, it will work on the first block received, but save the second block received in case the branch of the chain that includes the second block becomes longer (at which point that device will switch to working on the branch of the chain that includes the second block).

Figure 4:
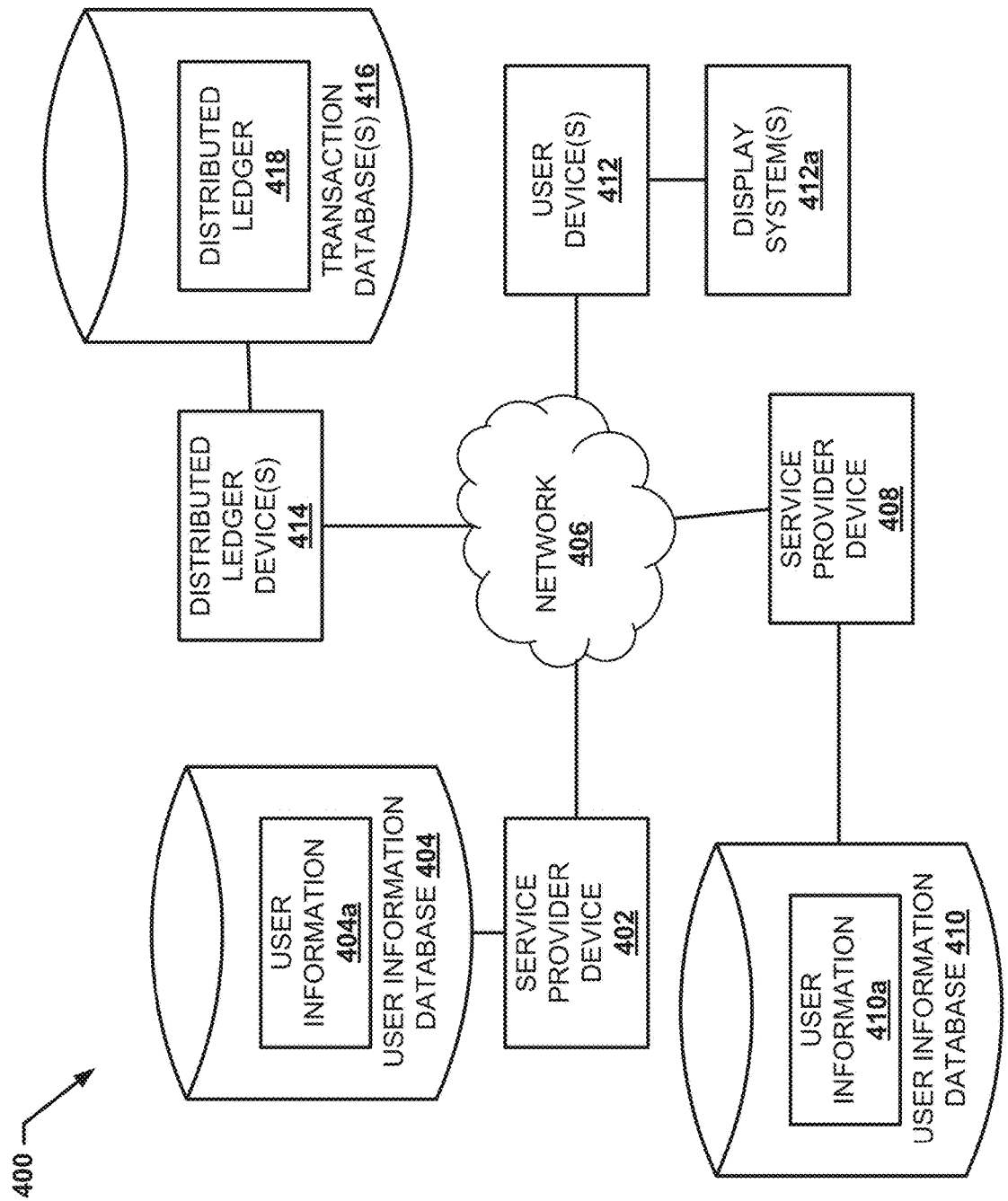
FIG. 4 is a schematic view illustrating an embodiment of a targeted content system.

Referring now to FIG. 4, an embodiment of a smart contract targeted content system 400 is illustrated and described briefly for reference in the method 100 discussed below. Some embodiments of the smart contract targeted content system 400 include a service provider device 402 that is coupled to a user information database 404 and a network 406, and a service provider device 408 that is coupled to a user information database 410 and the network 406. In some embodiments, at least one of the service provider devices 402 may be operated by a payment service provider such as, for example, PAYPAL® Inc. of San Jose, Calif., United States. In some embodiments, the user information database 404 may store user information 404a associated with user interaction(s) with webpage(s) provided by the service provider device 402, and the user information database 410 may store user information 410a associated with user interaction(s) with webpage(s) provided by the service provider device 410. As discussed below, the system provider device 402 may be configured to retrieve the user information 404a from the user information database 404 and/or retrieve user information 410a from the user information database 410 through the network 406, and provide content to user device(s) 412 based on any user information received from those user information databases 404 and/or 410. Similarly, the system provider device 408 may be configured to retrieve the user information 410a from the user information database 410 and/or retrieve user information 404a from the user information database 404 through the network 406, and provide content to user device(s) 412 based on any user information received from those user information databases 404 and/or 410.

As such, the smart contract targeted content system 400 includes a user device(s) 412 that are coupled to display system(s) 412a and the network 406. The user device(s) 412 may provide web browsers to allow a user to access webpages hosted by the service provider devices 402 and/or 408. In the illustrated embodiment, the smart contract targeted content system 400 may also include distributed ledger device(s) 414 that are coupled to a transactional database 416 and the network 406. As discussed above, the distributed ledger device(s) 414 may operate to receive virtual currency transactions broadcast by the service provider device(s) 402 and 408 and the user device 412, confirm those transactions, and generate/maintain a distributed ledger 418 (i.e., a public or private blockchain stored on each of those devices) discussed above with reference to FIG. 3. Further still, while illustrated in FIG. 4 and discussed in some embodiments below as operating separately to perform separate functions, in some embodiments, the functionality of a the service provider device(s) 402 and 408 and the distributed ledger device(s) 414 may be combined such that computing devices in a distributed network operate to maintain a distributed ledger while also operating to provide the targeted content as discussed below. Thus, while a specific embodiment has been illustrated, one of skill in the art in possession of the present disclosure will appreciate that smart contract targeted content system 400 illustrated in FIG. 4 may include a variety of modification while remaining within the scope of the present disclosure.

Figure 5:
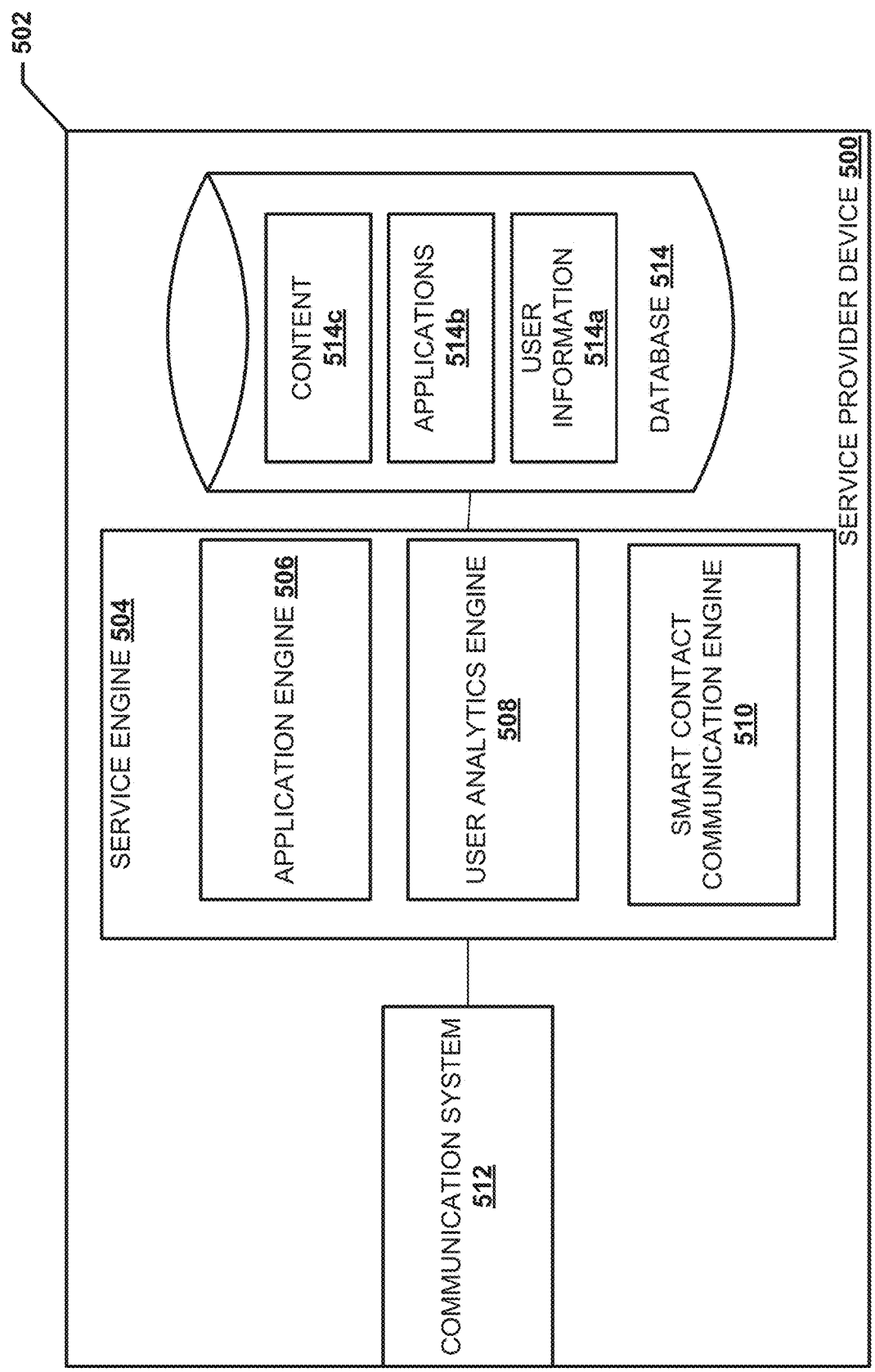
FIG. 5 is a schematic view illustrating an embodiment of a service provider device used in the targeted content system of FIG. 4.

Referring now to FIG. 5, an embodiment of a service provider device 500 is illustrated that, in some embodiments, may be the service provider device(s) 402 and/or 408 discussed above. As such, in some examples the service provider device 500 may be provided by one or more server devices. However, one of skill in the art in possession of the present disclosure will recognize that the service provider device 500 may be provided by any of a variety of computing devices such as desktop computing systems, laptop/notebook computing systems, tablet computing systems, mobile phones, Application Specific Integrated Circuit (ASIC) computing systems, and/or other computing device known in the art, while remaining within the scope of the present disclosure.

In the illustrated embodiment, the service provider device 500 includes a chassis 502 that houses the components of the service provider device 500, only some of which are illustrated in FIG. 5. For example, the chassis 502 may house a processing system (not illustrated) and a non-transitory memory system (not illustrated) that includes instructions that, when executed by the processing system, cause the processing system to provide a service engine 504 that is configured to perform the functions of the service engines and service provider devices discussed below according to the method 100. For example, the service engine 504 may include an application engine 506 that is configured to provide applications, webpages, and other service applications to a user device, as well as provide any of the other functions of the application engines discussed below. The service engine 504 may also include a user analytics engine 508 that is configured gather user information about the user and the user's interaction with an application, as well as perform any of the other functions of the user analytics engines discussed below. The service engine 504 may also include smart contract communication engine 510 that is configured to communicate with a smart contract stored in a distributed ledger, as well as perform any of the other functions of the smart contract communication engines discussed below.

The chassis 502 may also house a communication system 512 that is coupled to the service engine 504 (e.g., via a coupling between the communication system 512 and the processing system) and that is configured to provide for communication through the network 406 as detailed below. In the illustrated embodiment, the service provider device 500 also includes a storage device with a database 514 that stores user information 514a, application(s) 514b, content 514c, as well as any of the other information utilized to provide the functionality discussed in further detail below. While the service provider device 500 is illustrated as including a chassis 502 that houses the database 514, one of skill in the art in possession of the present disclosure will recognize that the database 514 may be provided in a different device/chassis than the service provider device 500 (e.g., a network attached storage device and/or any other device or storage system known in the art) while remaining within the scope of the present disclosure.

Referring back to FIG. 1, the method 100 begins at block 102 where a first user interaction is detected between a first user device and a currently viewed webpage. In an embodiment, at block 102, a user of the user device 412 may interact with an application 514b provided by the application engine 506 of the service provider device 402. For example, the user may navigate via a web browser to a website that includes a plurality of webpages hosted by the service provider device 402. However, the application 514b may be any native application, web application, and/or any other application provided by the service provider device 402 while remaining within the scope of the present disclosure. In various embodiments, the service provider device 402 may receive a user device identifier from the user device 412 interacting with the service provider device 402. In an example, the user device 412 may provide an HTML request to receive a webpage, and the HTML request may include a user device identifier for the user device 412 such as a phone number, an Internet protocol (IP) address, a media access control (MAC) address, and/or any other user device identifier and/or user identifier that would be apparent to one of skill in the art in possession of the present disclosure.

The method 100 then proceeds to block 104 where a first transaction that includes the first user device identifier for the first user device is generated. In an embodiment, at block 104, in response to detecting an interaction between the between first user device and a currently viewed webpage, the smart contract communication engine 510 on the service provider device 402 may generate a transaction that "requests" user information about the user associated with the user device 412, which in some embodiments may require the smart contract communication engine 510 generate a transfer that transfers funds to a payee. In a specific example, a system provider such as, for example, PayPal Inc. of San Jose, Calif., United States may provide a wallet application that is accessible by the smart contract communication engine 510, which may use that wallet application to generate the transaction at block 104. In a specific example, in response to the application engine 506 detecting the user device accessing the webpage and identifying the IP address of the user device, the smart contract communication engine 510 may generate a crypto currency transaction (e.g., a zero amount crypto currency transaction, a crypto currency "micro" relatively low amount) transaction, etc.) that includes that IP address at block 104. As would be understood by one of skill in the art in possession of the present disclosure, the first transaction may identify a public address associated with a smart contract in the distributed ledger that is utilized by the smart contract targeted content system 400.

The method 100 then proceeds to block 106 where the first transaction is broadcast to cause the first transaction to be sent to the smart contract stored in the distributed ledger. As would be understood by one of skill in the art in possession of the present disclosure, the broadcasting of the first transaction generated at block 104 causes the first transaction to be sent to be received by each of the computing devices in the distributed network that maintains the distributed ledger, and the public address that is identified in the first transaction and associated with a smart contract in the distributed ledger will cause those computing devices to access and/or provide for the execution of that smart contract as discussed below.

For example, a transaction created conventionally as discussed above but that also includes a user device identifier (e.g., the IP address of the user device), may have the smart contract public address (which would be designated as a "receiving" public address in such conventional crypto currency transactions). As such, when that transaction is broadcast by the service provider device 402, the distributed ledger devices 414 that maintain the distributed ledger 418 add that transaction to a block such that the transaction amount is transferred to the smart contract public address that is associated with the smart contract (via the transfer from the first service provider public address that created the first transaction). As discussed below, the transaction amount of the crypto currency that is transferred to the smart contract public address may be subsequently dealt with (i.e., transferred to the user, stored in the blockchain, transferred to another service provider, etc.) based on a variety of rules for dealing with crypto currency in the smart contract targeting content system 400 that may be defined by the smart contract provided at the smart contract public address. While some examples of the functionality provided by a smart contract are detailed below, one of skill in the art in possession of the present disclosure will recognize how a smart contract may be applied in the method 100 to provide for any of the functionality described herein.

In various embodiments, the smart contract may be associated (e.g., at the smart contract address on the blockchain) with a plurality of transactions that each includes user information associated with a user device identifier (e.g., the IP address discussed above). Of any plurality of transactions associated with a smart contract in the smart contract targeted content system 400, any portion of those transactions may include the same user device identifier, and may include user information that was associated with the smart contract prior to method 100, For example, the user device 412 may have interacted with a webpage of the service provider device 402 and/or the service provider device 408 and, in response, the user analytics engine 508 of the service provider device(s) 402 and/or 408 may have tracked the user's interactions with any respective website to gather and store user information that describes those interactions. For example, the user information may include which webpages of the website were visited by the user of the user device 412, a duration of time that the first user spent at a webpage, webpage links selected by the user, curser tracking information, heat maps, search engine queries, purchases completed by the user, demographic information that the user inserted into fields of the webpage, and/or any other user information that can be gathered from user interactions with a webpage and/or used to provide targeted content to the user that would be apparent to one of skill in the art in possession of the present disclosure.

As such, the user analytics engine 508 may include any user tracking and/or analytics software configured to track a user's interactions with a website to gather the user information such as, for example, GOOGLE™ Analytics, HOTJAR™, INSPECTLET™, CLICKTALE™, and/or any other session tracking programs that would be apparent to one of skill in the art in possession of the present disclosure.

In various embodiments and in response to a user access of their website/webpage, the service provider device 402 and/or the service provider device 408 may generate a transaction (e.g., as described above using the smart contract communication engine 510) that includes the first user device identifier for the user device 412 that interacted with the webpage of the service provider device 402 and/or 408, along with data that provides for access to the user information gathered from the interaction. While in some examples, all of the user information gathered from the interaction may be included directly in the transaction for storage on the blockchain/distributed ledger, in other examples the user information gathered from the interaction may be stored in the user information database 404 and/or the user information database 410 maintained by the service provider devices(s), and the transaction may include a link to user information database that provide for access to that user information. As would be understood by one of skill in the art in possession of the present disclosure, the use of links in the transaction to provide access to user information reduces the size of the transaction and the amount of data that must be stored on the distributed ledger 414, which may reduce processing time associated with creating and maintaining the distributed ledger. In various examples, the transaction may also include an amount of the crypto currency as described above. The service provider device 402 and/or the service provider device 408 may broadcast the transaction that identifies the smart contract public address with which the smart contract is associated, along with a transaction amount, similarly as described in the conventional crypto currency blockchain system above. As such, a plurality of transactions sent to the smart contract may associate user identifiers with that smart contract, and respective links to user information that describes previous interactions of an associated user with websites/webpages/content.

In various embodiments, transactions that associate user identifiers and respective links to user information with smart contracts, as well as transactions that request user information, may not require any amount of crypto currency. However, sending crypto currency along with such transactions may build up an amount of crypto currency that is available to the smart contract for use in compensating users for use of the smart contract targeted content system 400. For example, with reference to FIG. 6, the smart contract 602 may generate transactions and requests for user information from the service provider device 402 and/or 408 when the smart contract 602 receives a request for user information in a transaction from the service provider device 402. The smart contract may use the crypto currency received in the request transaction to incentivize the service provider device 402 and/or 408 to provide the user information that is associated with the first user device identifier and stored on the user information database 404 and/or 410, respectively. In various embodiments, the service provider devices 402 and/or 408 may voluntarily provide user information in transactions when those service provider devices gather that user information (in response to a user accessing their website/webpage). In some embodiments, the smart contract may include rules that limit what user information a service provider device may access unless that service provider device also provides user information to the smart contract, which provides an incentive for the service provider to provide user information to the smart contract targeted content system 400.

As such, each of the user information transactions associated with the smart contract may include user information associated with a respective user device. For example, first user information may be associated with a second user interaction (between the user device 412 and a previously viewed webpage) that occurred prior to the first user interaction in block 102 of method 100, which may include the user of the user device 412 interacting with a webpage of the service provider device 402 and/or a webpage of the service provider device 408. Upon receiving a crypto currency and a user device identifier included in the first transaction that requests user information, the smart contract may execute to provide all of the first user information that is associated with that user device identifier and that is stored in the transactions associated with that smart contract. However, in various examples, the smart contract may be configured with various rules that determine what user information is received. For example, the smart contract may include rules to provide user information from: a predefined number of most recent transactions (e.g., last 5 transactions, last 10 transactions, etc.) that include the user device identifier, transactions associated with the certain service providers (e.g., ignore transactions associated with the service provider device that is providing the request for user information), transactions that include the user device identifier that were completed in a predefined time period (e.g., the transactions that include the user device identifier and that were contributed in the last hour, the past day, the past week, the past month, the past six months, the past year, and/or any other time duration), and/or any other conditions or events that would be apparent to one of skill in the art in possession of the present disclosure.

Figure 6A:
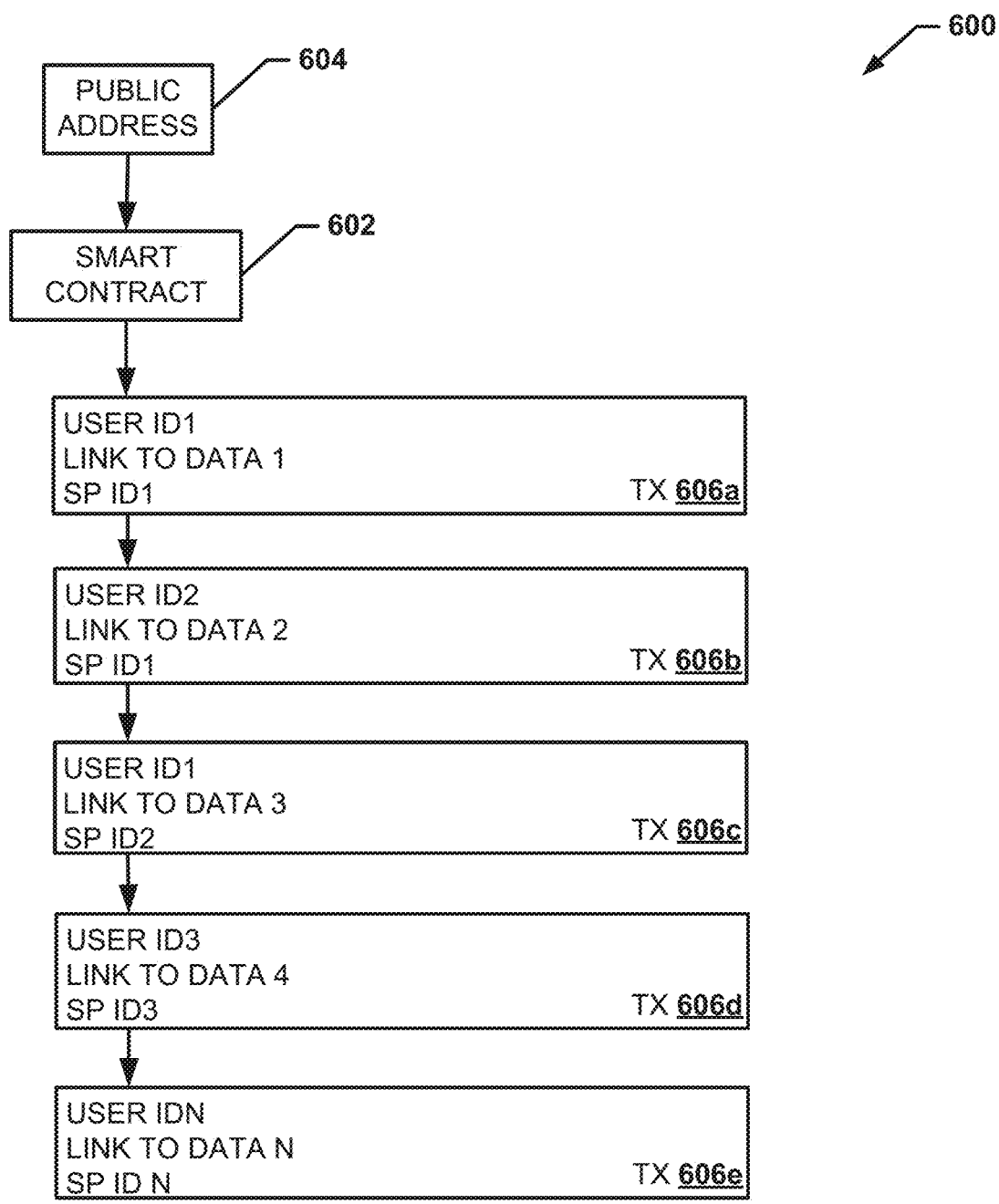
FIG. 6A is a schematic view illustrating an embodiment of a smart contract and transactions associated with the smart contract.
Figure 6B:
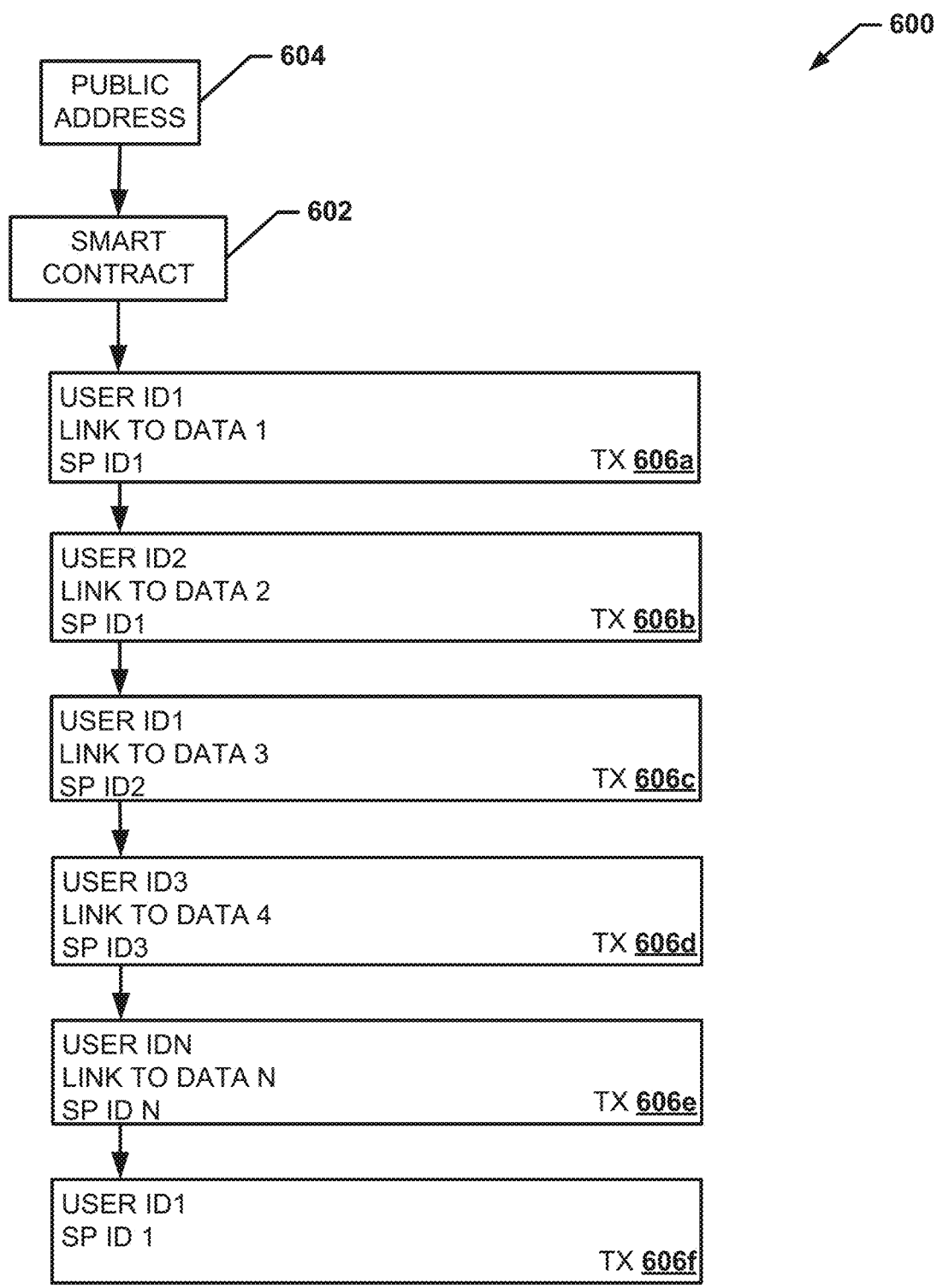
FIG. 6B is a schematic view illustrating an embodiment of the smart contract of FIG. 6A and the transactions associated with the smart contract.

FIGS. 6A and 6B illustrate a block diagram of an example of a smart contract data structure 600 that may be included in the distributed ledger 418, The smart contract data structure 600 may include a smart contract 602 that is provided on the distributed ledger 418 and associated with a smart contract public address 604. Prior to the method 100 and as discussed above, the smart contract 602 may have gathered and/or received transactions that each include user information collected by respective service provider devices during user sessions between user devices and webpages provided by those service provider devices. For example, in FIG. 6A a transaction 606a was added to the distributed ledger 418 in association with the smart contract 602, and includes a first user device identifier, a link to first user information, and in some embodiments a first service provider identifier of a first service provider that provided the transaction 606a to the smart contract 602. Similarly, a transaction 606b was added to the distributed ledger 418 in association with the smart contract 602, and includes a second user device identifier of a second user device, a link to second user information, and the first service provider identifier of the first service provider that provided the transaction 606b to the smart contract 602. A transaction 606c was also added to the distributed ledger 418 in association with the smart contract 602, and includes the first user device identifier of the first user device, a link to third user information, and the second service provider identifier of the second service provider that provided the transaction 606c to the smart contract 602. A transaction 606d was also added to the distributed ledger 418 in association with the smart contract 602, and includes a third user device identifier of a third user device, a link to fourth user device information, and a third service provider identifier of a third service provider that provided the transaction 606d to the smart contract 602. The smart contract 602 may be associated up to the nth transaction 606e which may include an nth user device identifier of an nth user device, a link to nth user information, and an nth service provider identifier of an nth service provider that provided the nth transaction 606e to the smart contract 602. While the example transactions 606a-606e include a single user information entry and a single user device identifier, one of skill in the art in possession of the present disclosure will recognize that a plurality of user information entries and a plurality of respective user device identifiers may be included in a transaction while remaining within the scope of the present disclosure.

Referring to FIG. 6B and block 106 of method 100, the smart contract 602 may then receive the transaction (e.g., transaction 606f) that was broadcast by the service provider device 402 in block 106 to the smart contract public address 604. The smart contract 602 may execute upon receiving the transaction 606f and determine that the transaction 606f is requesting user information for the user device 412 associated with the first user device identifier (e.g., USER ID1) that is included in the transaction 606f. The execution of the smart contract 602 operates to gather all the user information associated with the first user device identifier (e.g., USER ID1) and provide that user information to the service provider device 402. For example, the smart contract 602 may provide the links to first user information from transactions 606a and 606c (e.g., LINK TO DATA1, LINK TO DATA 3) based on both including the first user device identifier (e.g., USER ID1). Furthermore, the smart contract may disperse crypto currency that is included in the transaction 606f and/or stored in association with the smart contract on the public ledger to the service provider public addresses of the service providers that provided the user information in transactions 606a and 606c (i.e., as a reward for providing user information that was later used by another service provider).

While the examples above describe the smart contract targeted content system 400 including a single smart contract, in various embodiments a plurality of smart contracts that interact with each other are envisioned as falling within the scope of the present disclosure. Furthermore, in some embodiments, the smart contract public address may be associated with smart contract tokens that are transferrable similarly to the electronic coins discussed above. However, in other embodiments, the smart contract public address may be utilized for the providing of user information to enable the provisioning of targeted content (e.g., via the signing of zero-token-transactions) without the need for token(s) or electronic coins to be allocated to that smart contract public address. While a few alternatives are described, one of skill in the art in possession of the present disclosure will recognize that the smart contract and its smart contract public addresses may function in a variety of manners that will fall within the scope of the present disclosure.

The method 100 then proceeds to block 108 where, in response to the execution of the smart contract based on the smart contract receiving the first transaction, first user information is received. In an embodiment at block 108, the service provider device 402 may receive the first user information. As discussed above, the first user information may be associated with a second user interaction between the first user device and a previously viewed webpage that occurred prior to the first user interaction as described above. For example, the first user information may identify webpages of a website that were previously visited by the user of the user device 412, a duration of time that user previously spent at a webpage, webpage links previously selected by the user, curser tracking information for a previous web session, search engine queries provided in a previous web session, purchases previously completed by the user, demographic information that the user previously inserted into fields of a webpage, and/or any other user information that can be gathered from user interactions with a webpage and/or used to provide targeted content to the user and that would be apparent to one of skill in the art in possession of the present disclosure. In various examples, the first user information received based on the execution of the smart contract may include one or more links to the first user information that the service provider device 402 may use in order to retrieve that user information from one or more user information databases (e.g., the user information database 404 and the user information database 410) controlled by another service provider device.

The method 100 then proceeds to block 110 where content is determined for display on the first user device via the currently viewed webpage based on the first user information. In an embodiment, at block 110, the application engine 506 that is included in the service provider device 402 may determine content (e.g., an audio object, a video object, an image, text, and/or other content that would be apparent to one of skill in the art in possession of the present disclosure), which may be included in the content 514c, for display via the currently viewed webpage on the user device. For example, the application engine 506 may include a plurality of rules, conditions, criteria, and/or priorities that, when satisfied, causes one or more content objects to be selected for display on the user device 412 via a webpage being provided for display on that user device 412. For example, the user information provided as a result of the execution of the smart contract may be utilized by the application engine 506 to select content based on content provisioning rules. For example, the application engine 506 may select content based on the user information indicating that that content will generate the most revenue when displayed to that user (e.g., because the user has previously purchased products/services associated with that content). As another example, the application may select content based on the user information indicating that that content has not been previously viewed by the user device 412 so that the content is not overly repetitive. As another example, the language of the content may be tailored based on the first user information (e.g., based on that first user information indicating that particular language has previously resulted in a desired user action).

In another example of the use of a content provisioning rule, content may be selected for display based on previous purchase history or interest of the user that is detailed in the first user information. In another example, the content may be selected based on the user information indicating that that content that was recently viewed (e.g., the user information may indicate that the user recently viewed a shoe website, and the application engine 506 may determine and select shoe advertisements to provide for display on the user device 412). While specific examples of the application engine 506 determining which content to provide for display on the user device 412 based on the received user information have been discussed, one of skill in the art in possession of the present disclosure will recognize other scenarios of selecting content based on user information of the present disclosure will fall within the scope of the present disclosure as well. Furthermore, while the application engine 506 included on the service provider device 402 is described as determining the content to be displayed based on the first user information associated with the user device 412, in various embodiments a content server and/or a third party server coupled to the service provider device 402 through the network 406 may determine which content to provide the user device 412 based on the first user information, and then provide that content to the service provider device 402 for display on the webpage or website, and the service provider device 402 may insert that content into the currently viewed webpage via the application engine 506.

The method then proceeds to block 112 where the content is provided for display on the first user device within the currently viewed webpage. In an embodiment at block 112, the application engine 506 may provide the selected content over the network 406 to the user device 412 to be displayed on the display system 412a. The application engine 506 may incorporate the content into the application being provided to the user device 412. For example, the content may be included in the currently viewed webpage that is displayed on the user device 412. The application engine 506 may then provide the content via the currently viewed webpage over the network 406 to be displayed on the display system 412a of the user device 412 via a web browser application.

While the user of the user device 412 is viewing the currently viewed webpage that includes the targeted content, the user analytics engine 508 of the service provider device 402 may gather second user information about the user's interactions with the currently viewed webpage. Similarly as described above, in response to the user providing any interaction with the targeted content displayed on the user device, the service provider device 402 may generate a second transaction that includes the first user device identifier and that is associated with second user information that describes that interaction. The service provider device 402 may broadcast the second transaction to cause the second transaction to be sent to the smart contract included in the distributed ledger 418. As discussed above, in some embodiments the service provider device 402 may receive, via the first service provider public address on the distributed ledger 418 in response to causing the second transaction including the second user information to be sent to the smart contract, a third transaction that includes an amount of crypto currency that incentivizes the sending of that user information to the smart contract targeted content system 400.

Figure 6C:
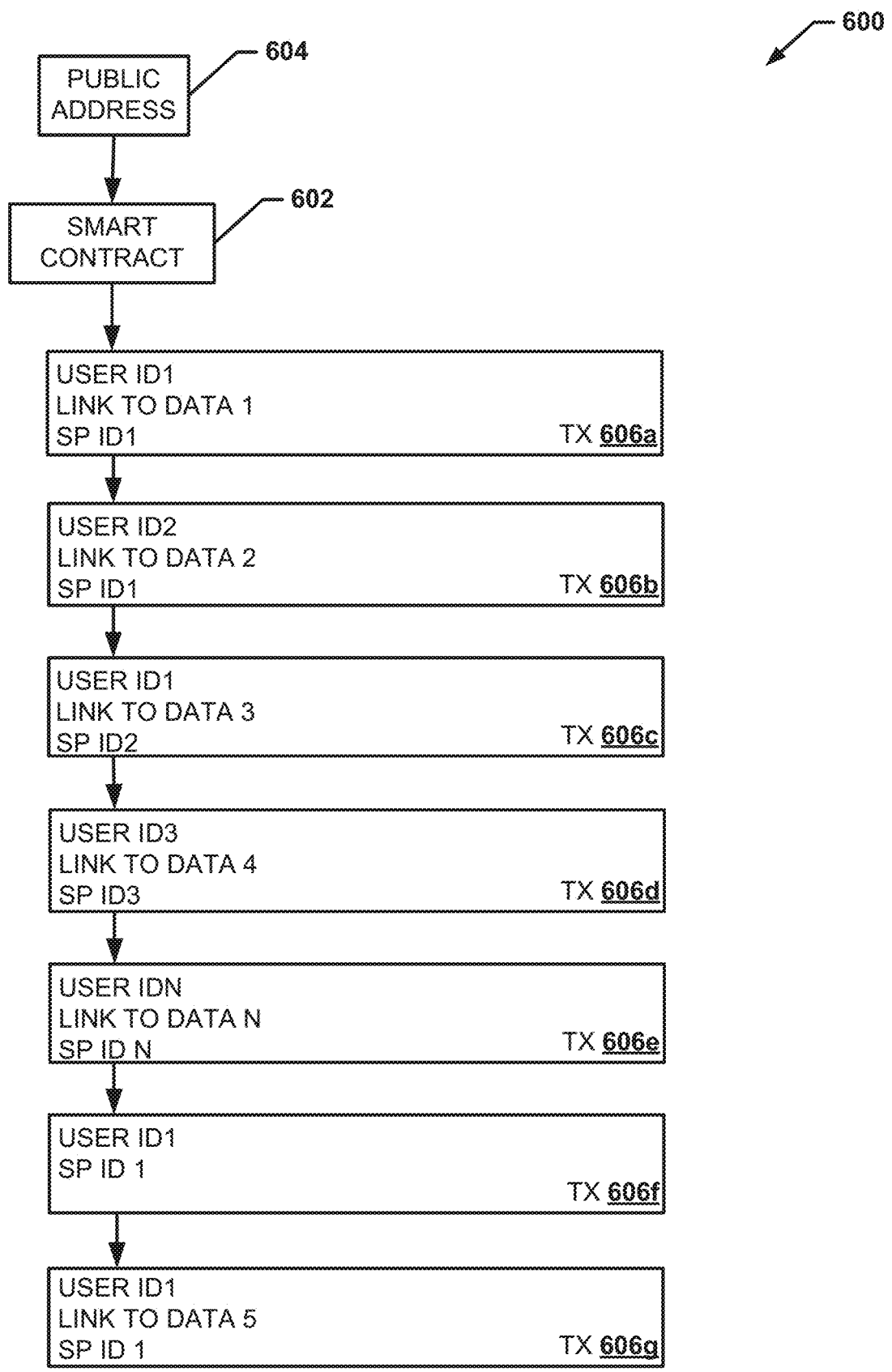
FIG. 6C is a schematic view illustrating an embodiment of the smart contract of FIGS. 6A and 6B and the transactions associated with the smart contract.

Referring to FIG. 6C, the service provider device 402 may then broadcast the transaction that includes the second user information and the user device identifier to the smart contract 602 via the smart contract public address 604. The transaction may be processed as the transaction 606g as a block in the distributed ledger 418 to cause it to be associated with the smart contract 602 on the distributed ledger device 414. In response, the smart contract 602 may generate the third transaction that includes an amount of crypto currency for transfer to the first service provider device that provided the second user information to the smart contract (or in response to any of the conditions described above being satisfied).

In various embodiments, the smart contract 602 may require that the service provider device 402 have permission from a user of the user device 412 to gather user information associated with user interactions with a webpage/website provided the service provider device 402 and/or provide that user information to the smart contract 602. For example, each transaction 606a-606e may include a user public address that is associated with the user device identifier, and when the smart contract 602 is executed in response to receiving a transaction and the user public address is included in that transaction, the smart contract 602 may determine that user has given permission to the service provider device 402 to track and gather user information about the user and provide that user information to the smart contract 602. The smart contract 602 may then provide crypto currency to that user public address each time the user information is provided to a service provider device.

In another example, the service provider device 402 and the user device 412 may generate a transaction where crypto currency is provided from a service provider public address to a user public address. That transaction may then be identified to the smart contract 602 to indicate that the user has given permission to the service provider device to gather and provide user information associated with the user of the user device 412. In another example, the user device 412 may generate a smart contract that may then be associated with the smart contract 602, and the smart contract generated by the user device 412 may provide rules to the smart contract 602 that define which service providers may provide the associated user's user information, which service providers can retrieve the user's user information, when the user information is available, the type of user information that is available, and/or other rules or restrictions that allow a user to have control over the privacy of their user information and that would apparent to one of skill in the art in possession of the present disclosure. While specific examples of a user controlling user information that may be gathered and shared between service provider devices is discussed, one of skill in the art in possession of the present disclosure will recognize a wide variety of techniques that allow the user to control how that user's information may be gathered and/or shared between service provider devices without departing from the scope of the present disclosure.

Thus, systems and methods have been described for providing targeted content using user information gathered and provided via smart contracts) on a distributed ledger. A targeted content system may use smart contracts to provide targeted advertisement in a webpage currently being viewed by a user by determining a user device identifier associated with the user's device that is interacting with the currently displayed webpage. The service provider device may then include that user device identifier in a transaction that is broadcast to a smart contract that is included on a distributed ledger and that is associated with a plurality of previous transactions that are configured to provide access to user information generated by that user in previous interactions with other webpages. The smart contract may execute in response to receiving the transaction with the user device identifier, and operate to retrieve some or all of the user information associated with the user device identifier for that user. The smart contract may provide that user information to the service provider device for use in making a determination as to what content to provide in the currently viewed webpage. Thus, the system and method of the present disclosure remove the need for cookies to be stored on the user device to track user interactions, while allowing a user to control user information that is associated with that user and that would otherwise be provided to advertisers without the user's knowledge and/or without any compensation (e.g., as is provided in the systems and methods of the present disclosure via rules in the smart contract that may provide for the transfer of crypto currency to a user public address of the user when their user information is used).

Figure 7:
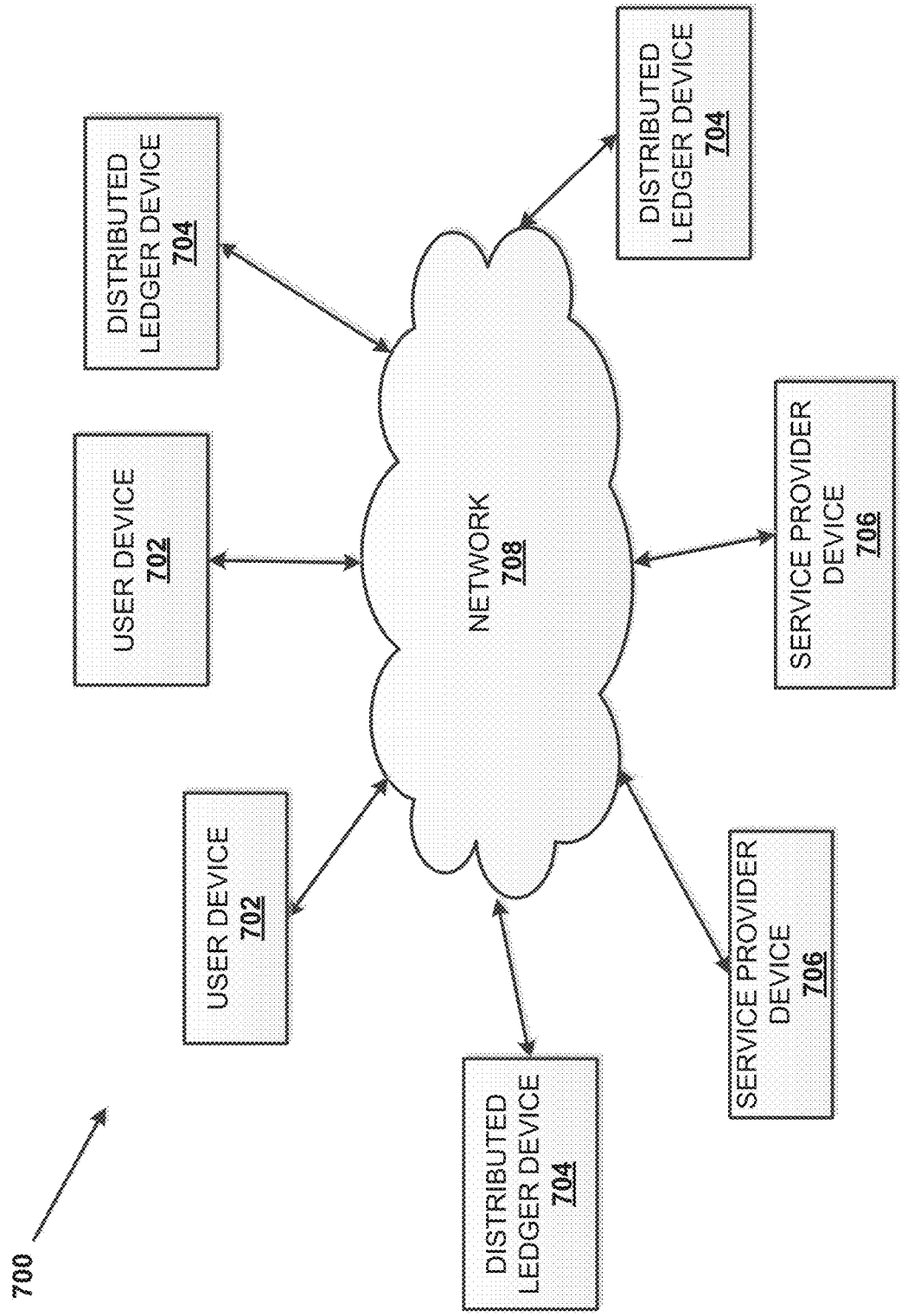
FIG. 7 is a schematic view illustrating an embodiment of a networked system.

Referring now to FIG. 7, an embodiment of a networked system 700 used in the smart contract targeted content system 400 described above is illustrated. The networked system 700 includes a plurality of user devices 702, a plurality of distributed ledger devices 704, and a plurality of system provider devices 706 in communication over a network 708. Any of the user devices 702 may be the user devices operated by the users, discussed above. Any of the distributed ledger devices 704 may be the distributed ledger devices discussed above. Any of the system provider devices 706 may be the system provider devices operated by the system providers, discussed above.

The user devices 702, distributed ledger devices 704, and/or system provider devices 706 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 700, and/or accessible over the network 708.

The network 708 may be implemented as a single network or a combination of multiple networks. For example, in various embodiments, the network 708 may include the Internet and/or one or more intranets, landline networks, wireless networks, and/or other appropriate types of networks.

The user devices 702 may be implemented using any appropriate combination of hardware and/or software configured for wired and/or wireless communication over network 708. For example, in one embodiment, the user devices 702 may be implemented as a personal computer of a user in communication with the Internet. In other embodiments, the user devices 702 may be a smart phone, wearable computing device, laptop computer, and/or other types of computing devices.

The user devices 702 may include one or more browser applications which may be used, for example, to provide a convenient interface to permit the user to browse information available over the network 708. For example, in one embodiment, the browser application may be implemented as a web browser configured to view information available over the Internet.

The user devices 702 may also include one or more toolbar applications which may be used, for example, to provide user-side processing for performing desired tasks in response to operations selected by the user. In one embodiment, the toolbar application may display a user interface in connection with the browser application.

The user devices 702 may further include other applications as may be desired in particular embodiments to provide desired features to the user devices 702. In particular, the other applications may include a payment application for payments assisted by a payment service provider. The other applications may also include security applications for implementing user-side security features, programmatic user applications for interfacing with appropriate application programming interfaces (APIs) over the network 708, or other types of applications. Email and/or text applications may also be included, which allow the user to send and receive emails and/or text messages through the network 708. The user devices 702 include one or more user and/or device identifiers which may be implemented, for example, as operating system registry entries, cookies associated with the browser application, identifiers associated with hardware of the user devices 702, or other appropriate identifiers, such as a phone number. In one embodiment, the user identifier may be used to associate the user with a particular account as further described herein.

Figure 8:
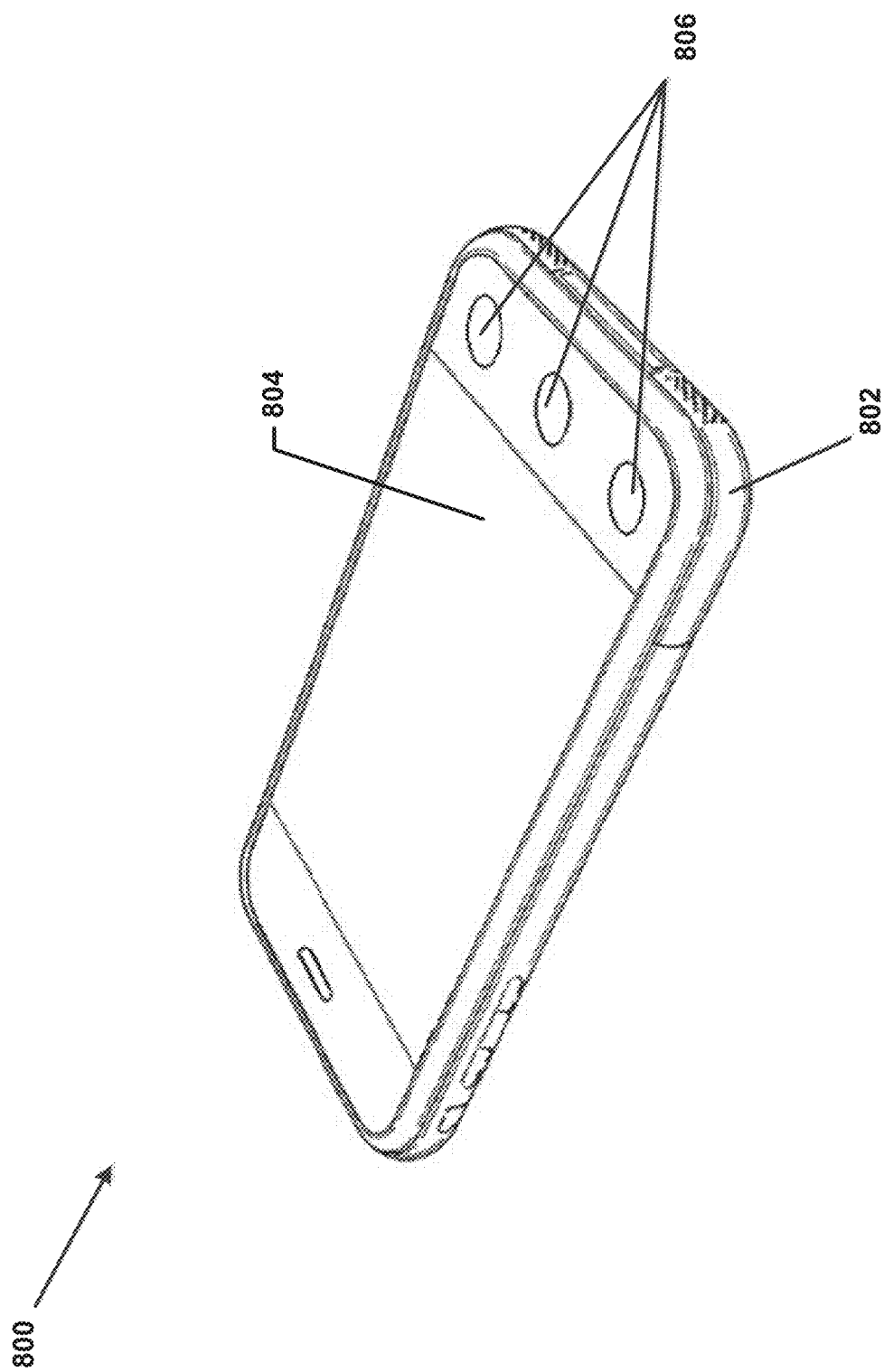
FIG. 8 is a perspective view illustrating an embodiment of a user device.

Referring now to FIG. 8, an embodiment of a user device 800 is illustrated. The device 800 may be any of the user devices discussed above. The device 800 includes a chassis 802 having a display 804 and an input device including the display 804 and a plurality of input buttons 806. One of skill in the art will recognize that the device 800 is a portable or mobile phone including a touch screen input device and a plurality of input buttons that allow the functionality discussed above with reference to the method 100. However, a variety of other portable/mobile devices and/or desktop devices may be used in the method 100 without departing from the scope of the present disclosure.

Figure 9:
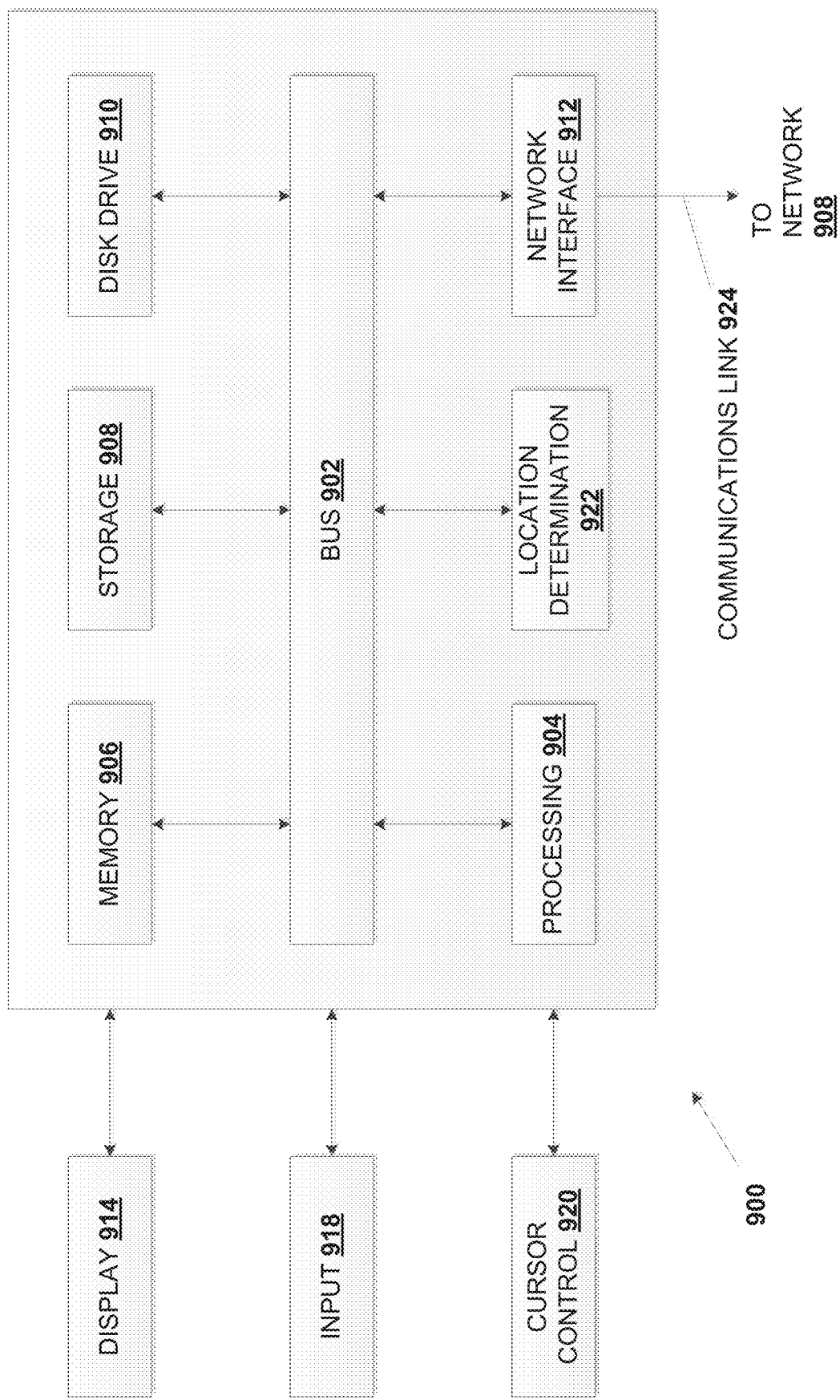
FIG. 9 is a schematic view illustrating an embodiment of a computer system.

Referring now to FIG. 9, an embodiment of a computer system 900 suitable for implementing, for example, the user devices, distributed ledger devices, and/or system provider devices, is illustrated. It should be appreciated that other devices utilized in the distributed ledger authentication system discussed above may be implemented as the computer system 900 in a manner as follows.

In accordance with various embodiments of the present disclosure, computer system 900, such as a computer and/or a network server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), a cursor control component 920 (e.g., mouse, pointer, or trackball), and/or a location determination component 922 (e.g., a Global Positioning System (GPS) device as illustrated, a cell tower triangulation device, and/or a variety of other location determination devices known in the art). In one implementation, the disk drive component 910 may comprise a database having one or more disk drive components.

In accordance with embodiments of the present disclosure, the computer system 900 performs specific operations by the processor 904 executing one or more sequences of instructions contained in the memory component 906, such as described herein with respect to the payer devices, payee devices, user devices, payment service provider devices, and/or system provider devices. Such instructions may be read into the system memory component 906 from another computer readable medium, such as the static storage component 908 or the disk drive component 910. In other embodiments, hard-wired circuitry may be used in place of or in combination with software instructions to implement the present disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 900. In various other embodiments of the present disclosure, a plurality of the computer systems 900 coupled by a communication link 924 to the network 708 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A targeted content system, comprising:
   a first non-transitory computer-readable medium;
   one or more first hardware processors coupled to the first non-transitory computer-readable medium and configured to execute smart-contract-based user/webpage interaction retrieval logic encoded on the first non-transitory computer-readable medium to cause the system to perform smart-contract-based user/webpage interaction retrieval operations comprising:
      detecting a first user interaction between a first user device and a currently viewed webpage;
      generating a first transaction that includes:
         a public distributed ledger address that is included in a distributed ledger; and
         a first user device identifier for the first user device; and
      broadcasting the first transaction via a network to cause the first transaction to be sent to a user/webpage interaction information smart contract that is stored in the distributed ledger at the public distributed ledger address;
   a second non-transitory computer-readable medium; and
   one or more second hardware processors coupled to the second non-transitory computer-readable medium and configured to execute smart-contract-based user/webpage interaction provisioning logic encoded on the second non-transitory computer-readable medium to cause the system to perform smart-contract-based user/webpage interaction provisioning operations comprising:
      receiving the first transaction via the network; and
      automatically executing, in response to receiving the first transaction, the user/webpage interaction information smart contract to:
         retrieve first user information associated with a second user interaction between the first user device and a previously viewed webpage that occurred prior to the first user interaction; and
         transmit the first user information, and
      wherein the smart-contract-based user/webpage interaction retrieval operations further comprise:
         receiving the first user information;
         determining, based on the first user information, content for display on the first user device via the currently viewed webpage; and providing, for display on the first user device, the content within the currently viewed webpage.

2. The system of claim 1, wherein the smart-contract-based user/webpage interaction retrieval operations further comprise:
gathering, based on a third user interaction between the first user device and the currently viewed webpage, second user information;
generating a second transaction that includes:
the public distributed ledger address;
the first user device identifier; and
the second user information; and
broadcasting the second transaction to cause the second transaction to be sent to the user/webpage interaction information smart contract that is stored in the distributed ledger at the public distributed ledger address.

3. The system of claim 2, wherein the smart-contract-based user/webpage interaction retrieval operations further comprise:
receiving, via the public distributed ledger address on the distributed ledger in response to the second transaction including the second user information being sent to the user/webpage interaction information smart contract, a third transaction that includes an amount of crypto currency.

4. The system of claim 1, wherein the first transaction includes an amount of crypto currency that is sent to the public distributed ledger address on the distributed ledger at which the user/webpage interaction information smart contract is stored.

5. The system of claim 1, wherein the first user information associated with the second user interaction between the first user device and the previously viewed webpage includes a link to the first user information stored in a user information database.

6. The system of claim 1, wherein the first user information associated with the second user interaction between the first user device and the previously viewed webpage includes data describing at least one advertisement viewed on the previously viewed webpage.

7. The system of claim 1, wherein the content includes at least one advertisement that is based on the second user interaction with the previously viewed webpage.

8. A method for providing targeted content using a smart contract, comprising
detecting, by one or more service provider device hardware processors executing smart-contract-based user/webpage interaction retrieval logic encoded on a service provider device non-transitory computer-readable medium in a service provider device, a first user interaction between a first user device and a currently viewed webpage;
generating, by the one or more service provider device hardware processors executing the smart-contract-based user/webpage interaction retrieval logic encoded on the service provider device non-transitory computer-readable medium in the service provider device, a first transaction that includes:
a public distributed ledger address that is included in a distributed ledger; and
a first user device identifier for the first user device; and
broadcasting, by the one or more service provider device hardware processors executing the smart-contract-based user/webpage interaction retrieval logic encoded on the service provider device non-transitory computer-readable medium in the service provider device, the first transaction via a network to cause the first transaction to be sent to a user/webpage interaction information smart contract that is stored in the distributed ledger at the public distributed ledger address;
receiving, by one or more smart contract executing device hardware processors executing smart-contract-based user/webpage interaction provisioning logic encoded on a smart contract executing non-transitory computer-readable medium in a smart contract executing device, the first transaction via the network;
automatically executing, by the one or more smart contract executing device hardware processors executing the smart-contract-based user/webpage interaction provisioning logic encoded on the smart contract executing non-transitory computer-readable medium in the smart contract executing device in response to receiving the first transaction, the user/webpage interaction information smart contract to:
retrieve first user information associated with a second user interaction between the first user device and a previously viewed webpage that occurred prior to the first user interaction; and
transmit the first user information;
receiving, by one or more service provider device hardware processors executing the smart-contract-based user/webpage interaction retrieval logic encoded on the service provider device non-transitory computer-readable medium in the service provider device, the first user information;
determining, by the one or more service provider device hardware processors executing the smart-contract-based user/webpage interaction retrieval logic encoded on the service provider device non-transitory computer-readable medium in the service provider device and based on the first user information, content for display on the first user device via the currently viewed webpage; and
providing, by the one or more service provider device hardware processors executing the smart-contract-based user/webpage interaction retrieval logic encoded on the service provider device non-transitory computer-readable medium in the service provider device for display on the first user device, the content within the currently viewed webpage.

9. The method of claim 8, further comprising:
gathering, by the one or more service provider device hardware processors executing the smart-contract-based user/webpage interaction retrieval logic encoded on the service provider device non-transitory computer-readable medium in the service provider device based on a third user interaction between the first user device and the currently viewed webpage, second user information;
generating, by the one or more service provider device hardware processors executing the smart-contract-based user/webpage interaction retrieval logic encoded on the service provider device non-transitory computer-readable medium in the service provider device, a second transaction that includes:
the public distributed ledger address;
the first user device identifier; and
the second user information; and
broadcasting, by the one or more service provider device hardware processors executing the smart-contract-based user/webpage interaction retrieval logic encoded on the service provider device non-transitory computer-readable medium in the service provider device, the second transaction to cause the second transaction to be sent to the user/webpage interaction information smart contract that is stored in the distributed ledger at the public distributed ledger address.

10. The method of claim 9, further comprising:
receiving, by the one or more service provider device hardware processors executing the smart-contract-based user/webpage interaction retrieval logic encoded on the service provider device non-transitory computer-readable medium in the service provider device via the public distributed ledger address on the distributed ledger in response to the second transaction including the second user information being sent to the user/webpage interaction information smart contract, a third transaction that includes an amount of crypto currency.

11. The method of claim 8, wherein the first transaction includes an amount of crypto currency that is sent to the public distributed ledger address on the distributed ledger at which the user/webpage interaction information smart contract is stored.

12. The method of claim 8, wherein the first user information associated with the second user interaction between the first user device and the previously viewed webpage includes a link to the first user information stored in a user information database.

13. The method of claim 8, wherein the first user information associated with the second user interaction between the first user device and the previously viewed webpage includes data describing at least one advertisement viewed on the previously viewed webpage.

14. The method of claim 8, wherein the content includes at least one advertisement that is based on the second user interaction with the previously viewed webpage.

15. A non-transitory machine-readable medium having encoded thereon machine-readable logic executable to cause a machine to perform operations comprising:
detecting, via smart-contract-based user/webpage interaction retrieval operations performed in response to executing the machine-readable logic encoded on the machine-readable medium, a first user interaction between a first user device and a currently viewed webpage;
generating, via smart-contract-based user/webpage interaction retrieval operations performed in response to executing the machine-readable logic encoded on the machine-readable medium, a first transaction that includes:
a public distributed ledger address that is included in a distributed ledger; and
a first user device identifier for the first user device; and
broadcasting, via smart-contract-based user/webpage interaction retrieval operations performed in response to executing the machine-readable logic encoded on the machine-readable medium, the first transaction to cause the first transaction to be sent to a user/webpage interaction information smart contract that is stored in the distributed ledger at the public distributed ledger address;
receiving, via smart-contract-based user/webpage interaction retrieval operations performed in response to executing the machine-readable logic encoded on the machine-readable medium, the first transaction via a network;
automatically executing, via smart-contract-based user/webpage interaction retrieval operations performed in response to executing the machine-readable logic encoded on the machine-readable medium, in response to receiving the first transaction, the user/webpage interaction information smart contract to:
retrieve first user information associated with a second user interaction between the first user device and a previously viewed webpage that occurred prior to the first user interaction; and
transmit the first user information,
receiving, via smart-contract-based user/webpage interaction retrieval operations performed in response to executing the machine-readable logic encoded on the machine-readable medium, the first user information;
determining, via smart-contract-based user/webpage interaction retrieval operations performed in response to executing the machine-readable logic encoded on the machine-readable medium based on the first user information, content for display on the first user device via the currently viewed webpage; and
providing, via smart-contract-based user/webpage interaction retrieval operations performed in response to executing the machine-readable logic encoded on the machine-readable medium for display on the first user device, the content within the currently viewed webpage.

16. The non-transitory machine-readable medium of claim 15, wherein operations further comprise:
gathering, via smart-contract-based user/webpage interaction retrieval operations performed in response to executing the machine-readable logic encoded on the machine-readable medium based on a third user interaction between the first user device and the currently viewed webpage, second user information;
generating, via smart-contract-based user/webpage interaction retrieval operations performed in response to executing the machine-readable logic encoded on the machine-readable medium, a second transaction that includes:
the public distributed ledger address;
the first user device identifier; and
the second user information; and
broadcasting, via smart-contract-based user/webpage interaction retrieval operations performed in response to executing the machine-readable logic encoded on the machine-readable medium, the second transaction to cause the second transaction to be sent to the user/webpage interaction information smart contract that is stored in the distributed ledger at the public distributed ledger address.

17. The non-transitory machine-readable medium of claim 16, wherein the operations further comprise:
receiving, via smart-contract-based user/webpage interaction retrieval operations performed in response to executing the machine-readable logic encoded on the machine-readable medium via the public distributed ledger address on the distributed ledger in response to the second transaction including the second user information being sent to the user/webpage interaction information smart contract, a third transaction that includes an amount of crypto currency.

18. The non-transitory machine-readable medium of claim 15, wherein the first transaction includes an amount of crypto currency that is sent to the public distributed ledger address on the distributed ledger at which the user/webpage interaction information smart contract is stored.

19. The non-transitory machine-readable medium of claim 15, wherein the first user information associated with the second user interaction between the first user device and the previously viewed webpage includes a link to the first user information stored in a user information database.

20. The non-transitory machine-readable medium of claim 15, wherein the first user information associated with the second user interaction between the first user device and the previously viewed webpage includes data describing at least one advertisement viewed on the previously viewed webpage.

\* \* \* \* \*